United States Patent [19]

Ochiai et al.

[11] Patent Number: 5,283,542
[45] Date of Patent: Feb. 1, 1994

[54] LOW-SHRINKAGE UNSATURATED WET TYPE POLYESTER RESIN (B.M.C.) FORMULATION COMPOSITION HAVING HIGH THERMAL CONDUCTIVITY AND MOLDED CIRCUIT BREAKER AND PARTS FORMED THEREFROM

[75] Inventors: Haruyuki Ochiai; Sadatoshi Murakami; Setsuo Hosogai, all of Hiroshima, Japan

[73] Assignee: Mitsubishi Denki Kabushiki Kaisha, Tokyo, Japan

[21] Appl. No.: 907,553

[22] Filed: Jul. 2, 1992

[30] Foreign Application Priority Data

Sep. 11, 1991 [JP] Japan .................. 3-231288
Nov. 28, 1991 [JP] Japan .................. 3-314431
Jun. 3, 1992 [JP] Japan .................. 4-141565

[51] Int. Cl.$^5$ ............................ H01H 83/00
[52] U.S. Cl. ........................ 335/6; 525/437;
525/446; 525/447; 525/448; 525/475; 525/479;
525/165; 428/34.4; 428/34.5; 428/34.7;
428/36.9; 523/218; 523/221
[58] Field of Search ............... 525/437, 446, 447, 448,
525/475, 479, 165; 428/34.4, 36.9, 34.5, 34.7;
335/6; 523/218, 221

[56] References Cited

U.S. PATENT DOCUMENTS 3,947,373  3/1976  Sobajima et al. ........... 523/200

FOREIGN PATENT DOCUMENTS 0421193  9/1990  European Pat. Off. .
3525301  1/1987  Fed. Rep. of Germany .
2-169653  6/1990  Japan .
1-242442  9/1990  Japan .

OTHER PUBLICATIONS

Derwent Publications Ltd., London, GB AN 89-117728 of Japanese Patent Abst. No. JP-A-1 062 337, Mar. 8, 1989.
Derwent Publications Ltd., London, GB AN 87-165763 of Japanese Patent Abstract No. JP-A-62 096 538, May 6, 1987.
Derwent Publications Ltd., London, GB AN 81-22423D of Japanese Patent Abstract No. JP-A-56 011 946, Feb. 5, 1981.

*Primary Examiner*—John Kight, III
*Assistant Examiner*—S. Acquah
*Attorney, Agent, or Firm*—Leydig, Voit & Mayer

[57] ABSTRACT

A composition of matter is provided which comprises low-shrinkage, wet-type unsaturated polyester (B.M.C.) having high thermal conductivity, glass fibers, and a particulate aluminum nitride filler having high thermal conductivity. Also provided is an electrical component housing which possesses high thermal conductivity and heat dissipation properties including a body of a low-shrinkage, wet-type unsaturated polyester (B.M.C.) composition having high thermal conductivity.

8 Claims, 1 Drawing Sheet

LOW-SHRINKAGE UNSATURATED WET TYPE POLYESTER RESIN (B.M.C.) FORMULATION COMPOSITION HAVING HIGH THERMAL CONDUCTIVITY AND MOLDED CIRCUIT BREAKER AND PARTS FORMED THEREFROM

FIELD OF THE INVENTION

The present invention relates to a high-thermal-conductivity, low-shrinkage, wet type unsaturated polyester composition which is known as bulk molding compound (B.M.C) for use in producing a housing and parts for an electrical device or instrument, which includes, for example, a base, cover, heat insulator, etc. in the case of a circuit breaker and has improved heat-dissipating properties, and also to a circuit breaker with includes formed parts obtained from the above composition.

BACKGROUND OF THE INVENTION

A conventional, low-shrinkage, wet type unsaturated polyester (B.M.C) composition has been produced by the following process. First, an unsaturated polyester resin, a hardener, and a low shrinkage rendering agent, e.g., polystyrene powder and polyethylene powder, in a total amount of from 20 to 28% by weight (hereinafter, all percents are by weight) based on the amount of the composition to be produced, are mixed with from 1.2 to 2.0%, based on the amount of the composition, of additives including a mold release agent and lubricant, such as stearic acid, calcium stearate, and the like, and this mixture is stirred, during which a calcium carbonate powder as a filler is incorporated into the mixture in an amount of from 45 to 60% based on the amount of the composition. Several minutes later, a slight amount of a carbon powder is added as a colorant and the resulting mixture is blended in a batch-type mixer for 40 minutes. Glass fibers are then added as a reinforcement in an amount of from 25 to 28% based on the amount of the composition and finishing blending is then conducted for 5 to 10 minutes. In this process, the reinforcement is added lastly because degradation of glass fibers should be prevented as far as possible so as to impart sufficient strength to formed products to be obtained from the formulation. Further, in order to prevent a temperature increase of the mixture due to stirring or blending, the temperature of the mixture is regulated by means of a jacket.

By molding or otherwise forming the compound obtained by the above-described process, formed products are obtained which have a thermal conductivity of $1.8 \times 10^{-3}$ cal/cm.sec.°C. due to the calcium carbonate particles contained therein in an amount of from 45 to 60%.

An application example for such a formed product obtained from the above low-shrinkage wet type unsaturated polyester (B.M.C) composition to the housing of earth-leakage circuit breaker is illustrated below.

In a prior known earth-leakage circuit breaker as shown in FIG. 2, the cover 1 and base 2, each being a resinous molded part, have sufficient thicknesses and have sufficient internal spaces between themselves and each of the conductive members, e.g., the front terminal board (not shown) and the rear terminal board 5, which have sectional areas suited to electric current to be applied. Because of this, even in this earth-leakage circuit breaker employing such formed parts having the above-described conventional composition, the Joule heat generated therein is readily dissipated throughout the circuit breaker, without leaving a local thermal stress, and the dissipated heat is radiated from the housing surface and other parts.

In known electrical devices or instruments having a housing, e.g., earth-leakage circuit breakers of the above-described type, the amount of Joule heat generated by the conductive circuit parts therein is increasing with the recent trend toward size reduction and functionality increase or toward breaker capacity increase. At present, the temperature increase problem for these electrical devices or instruments has reached such a level that heating of such devices or instruments cannot be coped with by the measures conventionally employed for temperature increase prevention, such as volume increase of conductive parts, utilization of spaces, heat insulation, etc. For this reason, it has become difficult to manufacture electrical devices or instruments that meet temperature increase standards provided for with respect to the respective products.

As one specific example of the above case, there is a desire to incorporate a ground fault detector having an integrated circuit into an earth-leakage circuit breaker of the above-described type without changing the outer dimensions (mounting size) of the breaker or reducing the mechanical strength of the circuit breaker housing and without lowering the current-conduction capacity of each conductive part.

In order to satisfy such a desire, components of the earth-leakage circuit breaker should be housed in the housing at an increased packaging density, so that the internal space within the circuit breaker becomes small and conductive members come to be disposed closer to one another.

As a result, if a formed part having the above-described conventional formulation is used as the housing, the following problems, for example, are posed. That is, thermal interaction between members changes the conditions under which the bimetal bends and prevents the integrated circuit and other members which are sensitive to thermal stress from performing their usual functions.

These problems are partly attributable to the insufficient thermal conductivity of the formed parts produced from the above-described low-shrinkage, wet type unsaturated polyester (B.M.C) composition and used in the housing, heat generating part-supporting parts, and the like. Illustratively stated, because of such formed parts, heat dissipation cannot occur sufficiently and, as a result, the heat generated is confined within the housing and the temperature therein rises unavoidably. In order to eliminate the above problems, it is necessary to improve the conventional, low-shrinkage, wet type unsaturated polyester (B.M.C) composition so as to give formed parts having high thermal conductivity and, hence, good heat-dissipating properties.

SUMMARY OF THE INVENTION

The present invention has been completed in order to overcome the above-described conventional problems.

An object of the present invention is to provide a high-thermal-conductivity, low-shrinkage, wet type unsaturated polyester (B.M.C) composition (hereinafter referred to as "high-thermal-conductivity resin composition"), which is obtained by modifying the above-described, conventional, low-shrinkage wet type unsaturated polyester (B.M.C) composition by replacing a proper part of the composition with a high-thermal-conductivity filler.

Another object of the present invention is to provide a circuit breaker which has been obtained by replacing the housing of a conventional circuit breaker of the above-described type with a housing obtained from the above high-thermal-conductivity resin composition and having the same mounting size as and interchangeable with the conventional one, and which can have a heightened packaging density and satisfy performance requirements.

Other objects and effects of the present invention will be apparent from the following description.

Accordingly, the present invention provides, in one aspect thereof, a high-thermal-conductivity resin composition which is for use in producing a housing to be employed in an electrical device or instrument and which contains fillers part of which is a filler having high thermal conductivity.

The present invention further provides, in another aspect thereof, a circuit breaker having a housing which comprises a formed part obtained from the above high-thermal-conductivity resin composition.

BRIEF DESCRIPTION OF THE DRAWINGS

In FIGS. 1 and 2, numerals 1 and 2 denote a cover and a base, respectively, both of which have been obtained by molding the above-described low-shrinkage, wet type unsaturated polyester (B.M.C) material. Numeral 5 denotes a rear terminal board and 6 a switch for circuit switching. Numerals 7 and 8 denote a pair of elements consisting of a contact element and a moving element, respectively, which are contacted and separated by the switch 6. Numeral 9 denotes an internal conductor which electrically connects the moving element 8 with the rear terminal board 5. Numeral 10 denotes a bimetal which drives the switch upon detection of eddy current and numeral 11 denotes a heater as a heat source for bending the bimetal. This earth-leakage circuit breaker further has a front terminal board (not shown) or the like to which an external wire (not shown) is connected.

DETAILED DESCRIPTION OF THE INVENTION

Figure 1:
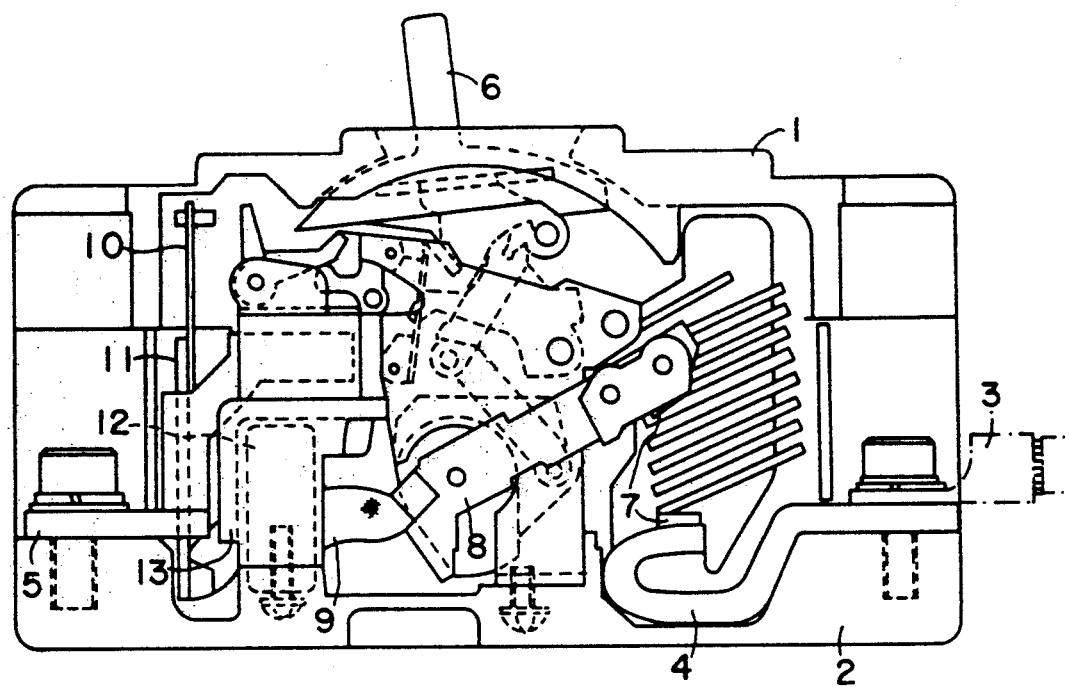
FIG. 1 is a view illustrating an earth-leakage circuit breaker as one embodiment of the circuit breaker according to the present invention.
Figure 2:
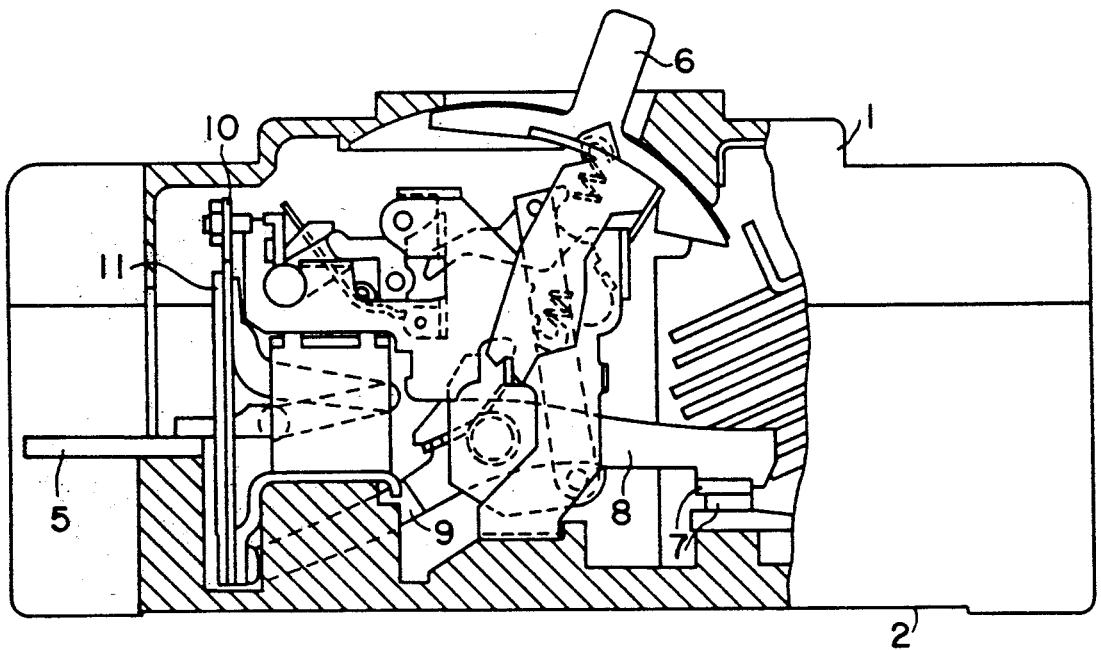
FIG. 2 is a partially cutaway view of a prior known conventional ground-fault circuit breaker.

The high-thermal-conductivity resin composition of the present invention comprises an unsaturated polyester and fillers part of which is a high-thermal-conductivity filler. This composition generally further contains a hardener, shrinkage-reducing agent, pigment, reinforcement, and other additives.

Examples of the high-thermal-conductivity filler include aluminum nitride, magnesia, alumina, boron nitride, silicon carbide, and the like. Of these, inorganic ceramics such as aluminum nitride, alumina, and magnesia are preferred which have thermal conductivities of $0.08 \times 10^{-3}$ cal/cm.sec.°C. or more and are electrical insulators.

The high-thermal-conductivity filler preferably is a combination of particles (fine powder) having an average particle diameter of from 1 to 8 μm, preferably from 2 to 5 μm, and spherical particles having an average particle diameter of from 20 to 90 μm, preferably from 50 to 80 μm, from the standpoints of the relationship between filler particle diameter and void, the relationship between filler particle diameter and dispersion, and dense packing with little void. It is also preferable that the high-thermal-conductivity filler be one in which the content of the particles having an average particle diameter of from 1 to 8 μm is from 10 to 25% and that of the particles having an average particle diameter of from 20 to 90 μm is from 75 to 90%.

The term average particle diameter herein means the particle diameter at the 50-percent position in the cumulative distribution curve for the filler particles. The term spherical particles herein means particles in which each particle is independently spherical with the longer diameter-to-shorter diameter ratio being almost 1/1 and which are less apt to suffer self-aggregation.

An especially preferred example of the high-thermal-conductivity filler is a combination of a powder of aluminum nitride or/and magnesia having an average particle diameter of several micrometers and spherical particles of sintered aluminum nitride or of alumina having an average particle diameter of from 20 to 90 μm, because this filler shows good dispersibility into the resin composition and imparts improved thermal conductivity to formed products to be obtained from the composition. With respect to glass fibers for use as a reinforcement, which have a thermal conductivity of about 0.03 cal/cm sec °C., it is preferred from the standpoint of maintaining the strength of formed products the fibers have a length of about ½ inch which is longer than ⅜ inch for conventional ones, and that the fibers be incorporated in an amount of from 25 to 28%, which is larger than the glass fiber amount for the ordinarily employed, conventional, low-shrinkage wet type unsaturated polyester (B.M.C) composition. In the case where a carbon powder is incorporated as a colorant, this powder also contributes to thermal conductivity.

In the composition of the present invention, the above-described high-thermal-conductivity filler comprises a part, preferably from 60 to 80%, more preferably from 65 to 70%, of all the fillers contained therein. Due to this, high thermal conductivity can be imparted to formed products obtained from the unsaturated polyester resin composition without reducing the moldability or formability of the composition or impairing the appearance, strength, and other properties of the formed products.

Formed products obtained by molding or otherwise shaping the high-thermal-conductivity resin composition of the present invention show high thermal conductivity, which has been imparted by the combined use of a high-thermal-conductivity filler such as an inorganic ceramic material, e.g., a magnesia powder, aluminum nitride powder, sintered aluminum nitride, or spherical alumina powder, and a reinforcement such as glass fibers or the like. In addition to the combined use of such a filler and reinforcement, other important factors that affect the high thermal conductivity of formed products are the particle shape and average particle diameter of the high-thermal-conductivity filler powder and the glass fibers. Specifically, the high-thermal-conductivity inorganic filler to be used in place of part of the conventionally employed calcium carbonate powder preferably is a combination of spherical particles having an average particle diameter of from 20 to 90 μm and a fine powder having an average particle diameter of several micrometers, with particle shape, pre-treatment of the particles, and the relative amounts of the two kinds of particles being particularly important. This is because uniform dispersion of both filler particles and glass fibers and the degree of closest packing of the filler particles, in particular, contribute to the high thermal conductivity, good appearance, and high strength of formed products.

Therefore, incorporation order, mixing time, and kneading temperature should be strictly regulated in producing the composition of the present invention. For the purpose of heightening the compatibility of the high-thermal-conductivity filler and of calcium carbonate or other filler as a conventionally employed filler with a polyester resin, a surface modifier such as a silane coupling agent may be incorporated in the composition. This can prevent formed products to be obtained from the composition from having impaired mechanical strength.

A molded product obtained by shaping the high-thermal-conductivity resin composition of the present invention may be used not only as a base or cover of a circuit breaker, magnetic switch, or the like but also as other housing part which is required to contribute to the control of heating of the housing in such an instrument. By such use of the molded product, heat dissipation occurs satisfactorily and heating of the instrument can be prevented.

The circuit breaker of the present invention, in which the housing comprises, as a base, cover, heat insulator, or the like, a formed part obtained by molding or otherwise shaping the high-thermal-conductivity resin composition described above without impairing the mechanical, electrical, and other properties and appearance required of the housing part, can effectively dissipate the Joule heat generated by conductive parts thereof. Therefore, thermal deterioration of electronic components contained in the circuit breaker can be prevented and heating of the terminal parts can be controlled below a prescribed level.

Examples of the other filler(s) used along with the high-thermal-conductivity filler include ones for use with unsaturated polyester resin compositions, such as a calcium carbonate powder, wollastonite powder, and the like.

The total amount of the high-thermal-conductivity filler and the other ordinary filler(s) incorporated in the high-thermal-conductivity resin composition of the present invention is preferably from 40 to 60%, more preferably from 45 to 55%, based on the amount of the composition. The following is an explanation of other ingredients for the composition, in which the incorporated amount of each ingredient is based on the total amount of the high-thermal-conductivity resin composition.

As the unsaturated polyester to be employed in the present invention, any of the unsaturated polyesters for use in producing housings for electrical devices or instruments may be used. For example, use of an epi-bis type polyester resin having a higher molecular weight than conventional ones and a viscosity of about 2,000 centipoises is preferred from a standpoint of mechanical strength. It is preferable to incorporate the unsaturated polyester resin in an amount of from 17 to 21%.

The hardener to be employed in the present invention may be an ordinarily used peroxide. The hardener preferably is incorporated in an amount of from 0.3 to 0.5%.

As the shrinkage-reducing agent to be employed in the present invention, use may, for example, be made of a thermoplastic resin solution prepared by dissolving a polystyrene powder and polyethylene powder in styrene monomer, the polystyrene and polyethylene each having a molecular weight about two times that of the corresponding conventional polymer. The shrinkage-reducing agent preferably is incorporated in an amount of from 4 to 6%.

A mold release agent such as, for example, calcium stearate which is a higher fatty acid soap, high-purity stearic acid, or the like may be incorporated in the composition of the present invention preferably in an amount of from 0.5 to 1.5%.

The colorant to be employed in the present invention may, for example, be a carbon powder, carbon black powder, or the like. The colorant preferably is incorporated in an amount of from 0.2 to 0.4%.

As the reinforcement to be employed in the present invention, it is preferred to use a glass fiber reinforcement chopped stem consisting of epoxy adhesive-treated strands each composed of several hundreds of cut glass fibers which have a length of ¼ inch and a diameter of 13 $\mu$m and have undergone a furan treatment for improving resin compatibility. The reinforcement preferably is incorporated in an amount of from 25 to 28%.

If required and necessary, a silane coupling agent may be incorporated as a surface modifier into the composition of the present invention to prevent formed products from having reduced mechanical strength. The amount of the surface modifier to be incorporated is preferably from 0.1 to 0.5%.

The above-described high-thermal-conductivity resin composition of the present invention was used to produce housings for electrical devices or instruments, for example, a base, cover, etc. as a housing for a small-sized circuit breaker, and the breaking strength of the housing side wall and thermal conductivity from the circuit breaker to a supporting board were measured. As a result, the housing side wall was found to have almost the same breaking strength as the ordinary product obtained from the conventional, low-shrinkage wet type unsaturated polyester (B.M.C) composition and, in particular, it was found that the housing obtained from the composition of the present invention showed such excellent thermal conductivity that the supporting board was heated to a temperature higher by about 5° to 10° C. than the supporting board temperature in the case of using the ordinary housing obtained from the conventional resin composition. Taking advantage of such excellent properties of the high-thermal-conductivity resin composition of the present invention, the present inventors have further developed a circuit breaker employing a formed part obtained from the resin composition.

An explanation is given below with respect to the circuit breaker according to the present invention.

The circuit breaker of the present invention is characterized in that a formed part obtained by molding or otherwise shaping the above-described high-thermal-conductivity resin composition is employed as a base, cover, heat insulator, or any of other parts of the housing of the circuit breaker.

Since the housing in the circuit breaker of the present invention not only has mechanical and electrical properties and appearance comparable to those of conventional ones but also has excellent thermal conductivity, the circuit breaker can be made to have a reduced size. Further, even where a ground fault detector or the like is additionally incorporated into the circuit breaker in addition to the conventional components and, as a result, the packaging density in the circuit breaker is increased, excessive heating of the circuit breaker can be prevented due to the excellent thermal conductivity of the housing.

As described above, the high-thermal-conductivity resin composition of the present invention, prepared by replacing part of the conventionally employed filler(s), i.e., calcium carbonate powder etc., with a high-thermal-conductivity filler, gives formed products which not only have high thermal conductivity and excellent heat-dissipating properties, but also have good appearance and strength comparable to those of conventional ones.

Further, in the circuit breaker of the present invention, since its housing comprises, as a base, cover, heat insulator, etc., a formed part obtained from the high-thermal-conductivity resin composition in place of a formed part obtained from the conventional low-shrinkage wet type unsaturated polyester (B.M.C) composition, the housing can have improved thermal conductivity and heat-dissipating properties without impairing its mechanical, electrical, and other properties. Therefore, the circuit breaker of the present invention is free from a local thermal stress and can house components therein at a high packaging density. Furthermore, the circuit breaker has an effect of being able to be smaller-sized and have higher performance. It should be noted that the circuit breaker of the present invention is not limited to earth-leakage circuit breakers and is applicable to all kinds of circuit breakers including earth-leakage circuit breakers and fuse-free circuit breakers.

The present invention will be illustrated in more detail with reference to the following examples, but the invention is not construed as being limited thereto. Unless otherwise indicated, ratios, percents and parts are by weight.

EXAMPLES 1 AND 2

According to the formulations shown in Tables 1 and 2, two kinds of high-thermal-conductivity resin compositions of the present invention were prepared as follows.

TABLE 1

| Ingredient | Amount (%) |
| --- | --- |
| Unsaturated polyester resin: | |
| Epi-bis type polyester | 17.9 |
| Hardener: | |
| Peroxide | 0.4 |
| Shrinkage-reducing agent: | |
| Polystyrene fine powder + polyethylene fine powder + styrene monomer | 5.4 |
| Filler: | |
| Calcium carbonate fine powder | 15.0 |
| Magnesia fine powder (50%-average particle diameter 1.1 μm) | 7.4 |
| Sintered aluminum nitride powder (50%-average particle diameter 75 μm) | 25.0 |
| Reinforcement: | |
| Glass fibers (length 1/2 inch, diameter 13 μm) | 26.9 |
| Mold release agent: | |
| Calcium stearate | 1.3 |
| Colorant: | |
| Carbon black powder | 0.3 |
| Surface modifier: | |
| Silane coupling agent | 0.4 |

TABLE 2

| Ingredient | Amount (%) |
| --- | --- |
| Unsaturated polyester resin: | |
| Epi-bis type polyester | 17.9 |
| Hardener: | |
| Peroxide | 0.4 |
| Shrinkage-reducing agent: | |
| Polystyrene fine powder + polyethylene fine powder + styrene monomer | 5.4 |
| Filler: | |
| Calcium carbonate fine powder | 15.9 |
| Aluminum nitride fine powder (50%-average particle diameter 4.2 μm) | 3.5 |
| Sintered aluminum nitride powder (50%-average particle diameter 50 μm) | 28.0 |
| Reinforcement: | |
| Glass fibers (length 1/2 inch, diameter 13 μm) | 26.9 |
| Mold release agent: | |
| Calcium stearate | 1.3 |
| Colorant: | |
| Carbon black powder | 0.3 |
| Surface modifier: | |
| Silane coupling agent | 0.4 |

First, the unsaturated polyester resin, hardener, shrinkage-reducing agent, mold release agent, and surface modifier were blended together at 40° C. by means of a jacketed kneader in which temperature was regulated by cooling the outer periphery thereof. While these ingredients were being kneaded at a kneader temperature of 40° C., the fillers, i.e., calcium carbonate fine powder, magnesia or aluminum nitride fine powder, and sintered aluminum nitride powder, were added thereto. Kneading was further conducted at 40° C. for 5 minutes and then the colorant, carbon powder, was added. Intermediate kneading was subsequently conducted at 40° C. for 40 minutes. Thereafter, the glass fiber reinforcement was added lastly in order to minimize glass fiber degradation, and finishing kneading was then conducted at 40° C. for 10 minutes, thereby obtaining a molding compound.

The two molding compounds thus obtained were formed, using a mold, into test pieces for the flexural strength test as provided for in JIS K6911, under the molding conditions (at about 150° C., under 100 to 120 kg/cm$^2$, for 3 minutes) for ordinary wet type unsaturated polyester (B.M.C) molding compositions. The flexural strength of the test pieces (100φ×3t) were measured and was found to be 13 Kgf/mm$^2$ on the average. Further, the thermal conductivity of each sample was measured by the temperature gradient method and laser flash method. As a result, the thermal conductivity for the sample containing magnesia fine powder and sintered aluminum nitride spherical particles was found to be 2.7×10$^{-3}$ cal/cm.sec.°C., while that for the sample containing aluminum nitride fine powder and sintered aluminum nitride spherical particles was found to be 3.0×10$^{-3}$ cal/cm.sec.°C.

COMPARATIVE EXAMPLE 1

According to the formulation shown in Table 3, a low-shrinkage wet type unsaturated polyester (B.M.C.) composition was prepared as follows.

TABLE 3

| Ingredient | Amount (%) |
| --- | --- |
| Unsaturated polyester resin: | |
| Polyester | 17.9 |

TABLE 3-continued

| Ingredient | Amount (%) |
|---|---|
| Hardener: | |
| Peroxide | 0.4 |
| Shrinkage-reducing agent: | |
| Polystyrene fine powder + polyethylene fine powder + styrene monomer | 5.4 |
| Filler: | |
| Calcium carbonate powder | 47.4 |
| Reinforcement: | |
| Glass fibers | 26.9 |
| Mold release agent: | |
| Calcium stearate | 1.3 |
| Colorant: | |
| Carbon black powder | 0.3 |
| Surface modifier: | |
| Silane coupling agent | 0.4 |

First, the unsaturated polyester resin, shrinkage-reducing agent, mold release agent, lubricant, surface modifier and hardener were metered to a jacketed kneader in which temperature could be regulated by cooling the outer periphery thereof. While these ingredients were being kneaded together in the kneader at a kneader temperature of 40° C., the filler, calcium carbonate powder, was added thereto and subsequently kneaded for several minutes. Kneading was further conducted at 40° C. for 40 minutes with adding colorant, and carbon black powder. Thereafter, the glass fiber reinforcement was added lastly and finishing kneading was conducted at 40° C. for 10 minutes, thereby obtaining a molding compound.

The thus-obtained molding compound was molded and evaluated in the same manner as in Examples 1 and 2. As a result, the flexural strength was 13.4 Kgf/mm$^2$ and the thermal conductivity was $1.8 \times 10^{-3}$ cal/cm·sec·°C.

From the results in Examples 1 and 2 and Comparative Example 1, it was found that the thermal conductivities of the molded products obtained from the compositions of the present invention were about 1.5 to 1.7 times that of the molded product obtained from the ordinary low-shrinkage wet type unsaturated polyester (B.M.C) composition and were almost equal to that of silicone radiator rubber.

In addition to the above evaluation, separate experiments were conducted in order to ascertain the effect of the fillers in the resin composition of the present invention on each of the appearance, flexural strength, and thermal conductivity of formed products obtained from the composition. As a result, it was ascertained that although the conventionally employed fillers including calcium carbonate are indispensable for maintaining good appearance, ability to be colored in black, and flexural strength, there is a tendency that the larger the amount of such a conventional filler, the lower the thermal conductivity. It was also ascertained that the amount and particle shape of the high-thermal-conductivity filler, such as magnesia powder, aluminum nitride powder, sintered aluminum nitride spherical particles, spherical alumina particles, etc., had considerable effect on the improvement of thermal conductivity.

EXAMPLE 3

An earth-leakage circuit breaker is explained below, with reference to FIG. 1, as one embodiment of the circuit breaker of the present invention.

As illustrated in FIG. 1, this earth-leakage circuit breaker according to the present invention comprises a cover 1 and base 2 which have been formed from the high-thermal-conductivity resin composition produced in Example 2, a front terminal board 4 to which an external wire 3 is connected, a rear terminal board 5, a switch 6 for circuit switching, a contact element 7 and moving element 8 which are a pair of elements connected and separated by the switch 6, an internal conductor 9 which connects the moving element 8 with the rear terminal board 5, a bimetal 10 which drives the switch upon detection of eddy current, a heater 11 as a heat source for bending the bimetal 10, a ground fault detector 12 for detecting ground fault, and a heat insulator 13 which mechanically supports the heater 11 and insulates the ground fault detector 12 from the heat generated by the heater 11. The heat insulator also is a formed product obtained from the high-thermal-conductivity resin composition produced in Example 2.

Because the above earth-leakage circuit breaker has been designed so as to have a smaller size and higher performance, each of the front terminal board 4, rear terminal board 5, moving element 8, internal conductor 9, and other components has a smaller sectional area than the conventional one. In this circuit breaker, the ground fault detector 12 and other components have been housed at a high packaging density.

Therefore, the ground fault detector 12 should be insulated from the heat generated by the external wire-connecting part and from the heat generated by the front terminal board 4, rear terminal board 5, moving element 8, and internal conductor itself, in order that a thermal stress be not cast upon electronic circuit elements, for example, contained in the ground fault detector 12.

In particular, the rear terminal board 5 should not be heated to a temperature above 50° C. according to JIS C 8371. Further, the ground fault detector 12 should be heat-insulated so that each of the elements constituting the detector is not heated beyond its allowable temperature limit. For example, the allowable temperature limit for semiconductors (ICs), in general, is 85° C. and, hence, use of these at temperatures higher than 85° C. results in impaired reliability.

It is, therefore, necessary that a heat generated should be rapidly dissipated throughout the whole circuit breaker by thermal conduction or other means without causing a local thermal stress, and the dissipated heat should be radiated by utilizing the surface area of the housing including the base, cover, etc.

As apparent from Examples 1 and 2 and Comparative Example 1 given above, formed parts obtained from the high-thermal-conductivity resin composition of the present invention can have a thermal conductivity as high as $3.0 \times 10^{-3}$ cal/cm·sec·°C., which has been significantly improved from the thermal conductivity value $1.8 \times 10^{-3}$ cal/cm·sec·°C. for formed parts obtained from the conventional low-shrinkage wet type unsaturated polyester (B.M.C) composition. In the circuit breaker of the present invention, local thermal stresses could, therefore, be eliminated and internal components could be housed at a high packaging density. Accordingly, the earth-leakage circuit breaker could be made to have a smaller size and higher performance.

Application of the high-thermal-conductivity resin composition particularly to the heat insulator 13 in the circuit breaker as in this example was found to enable relaxation of the thermal stress imposed on the ground fault detector 12 placed inside the heat insulator without changing the heat-bending characteristics of the bimetal and the heating characteristics of the heater.

While the invention has been described in detail and with reference to specific embodiments thereof, it will be apparent to one skilled in the art that various changes and modifications can be made therein without departing from the spirit and scope thereof.

What is claimed is:

1. A composition of matter, comprising low-shrinkage, wet-type unsaturated polyester (B.M.C) having high thermal conductivity, glass fibers, and a particulated aluminum nitride filler having high thermal conductivity.

2. A composition as claimed in claim 1, wherein said filler having high thermal conductivity is composed of from 10 to 25% by weight of particles having an average particle diameter of from 1 to 8 $\mu$m and from 75 to 90% by weight of spherical particles having an average particle diameter of from 20 to 90 $\mu$m.

3. A circuit breaker comprising a formed part obtained from the composition of claim 1.

4. An electrical component housing possessing high thermal conductivity and heat dissipation properties comprising a body composed of a low-shrinkage, wet-type unsaturated polyester (B.M.C) composition possessing high thermal conductivity, said polyester being reinforced with 25% to 28% glass fibers with a thermal conductivity of about 0.03 cal/cm-sec-°C., and said polyester having added thereto a filler including 60% to 80% high thermal conductivity particles possessing thermal conductivity of at least $0.08 \times 10^{-3}$ cal/cm-sec-°C. of aluminum nitride in the form of 10 to 25% particles of a diameter of between 1 and 8 $\mu$m and 75 to 90% particles of a diameter of between 20 and 90 $\mu$m.

5. An electrical component housing according to claim 4 where the filler includes material selected from the group consisting of calcium carbonate powder and wollastonite powder.

6. An electrical component housing according to claim 4 where the polyester is an epi-bis polyester with a viscosity of about 2,000 centipoise.

7. An electrical component housing according to claim 4 where the glass fibers are about ⅛ inch long and a diameter of about 13 $\mu$m.

8. An electrical component housing according to claim 4 where the filler includes 65% to 70% high thermal conductivity particles.

* * * * *